(12) United States Patent
Paing et al.

(10) Patent No.: US 7,566,100 B2
(45) Date of Patent: Jul. 28, 2009

(54) SEAT RECLINER FOR VEHICLES

(75) Inventors: Hyun-Sung Paing, Incheon (KR);
Gun-Young Park, Incheon (KR)

(73) Assignee: Austem Co., Ltd., Cheonan-Si, Chungcheongnam-Do (KR)

( * ) Notice: Subject to any disclaimer, the term of this patent is extended or adjusted under 35 U.S.C. 154(b) by 135 days.

(21) Appl. No.: 11/442,123

(22) Filed: May 30, 2006

(65) Prior Publication Data
US 2007/0278836 A1 Dec. 6, 2007

(51) Int. Cl.
*B60N 2/02* (2006.01)
(52) U.S. Cl. ............... 297/362; 297/361.1; 297/253
(58) Field of Classification Search ............ 297/361.1, 297/300.3, 300.4, 301.2, 301.3, 302.2, 302.3, 297/344.19, 463.1, 362
See application file for complete search history.

(56) References Cited

U.S. PATENT DOCUMENTS

| 5,692,589 | A | * | 12/1997 | Beguin | 192/39 |
| 6,092,874 | A | * | 7/2000 | Kojima et al. | 297/367 |
| 6,267,443 | B1 | * | 7/2001 | Kurita et al. | 297/374 |
| 6,520,583 | B1 | * | 2/2003 | Bonk | 297/367 |
| 6,910,738 | B2 | * | 6/2005 | Bonk | 297/367 |
| 2002/0050732 | A1 | * | 5/2002 | Koga et al. | 297/362 |
| 2003/0178878 | A1 | * | 9/2003 | Hoshihara et al. | 297/361.1 |

* cited by examiner

*Primary Examiner*—David Dunn
*Assistant Examiner*—James Alex
(74) *Attorney, Agent, or Firm*—Robert E. Bushnell, Esq.

(57) ABSTRACT

Disclosed herein is a seat recliner for vehicles. The seat recliner of the present invention includes a support bracket, which is mounted to a seat frame, a guide holder, which is coupled at a first end thereof to the support bracket, and a slide holder, which is rotatably coupled to the guide holder between the support bracket and the guide holder. The seat recliner further includes at least one rotating bracket, which is coupled to the slide holder, a clutch unit, which controls the engagement between the guide holder and slide holder, and a control unit, which controls the clutch unit. The slide holder has a stop unit, which protrudes towards the support bracket, and the support bracket has a stopper, which contacts the stop unit when the slide holder is rotated at a predetermined angle, thus limiting rotation of the slide holder within a predetermined range. In the structure of the seat recliner disclosed in the present invention, the recliner prevents malfunctions of a seat back and makes the process of manufacturing the seat recliner more efficient.

12 Claims, 8 Drawing Sheets

SEAT RECLINER FOR VEHICLES

BACKGROUND OF THE INVENTION

1. Field of the Invention

The present invention relates generally to a seat recliner for vehicles and, more particularly, to a seat recliner for vehicles which improves on the shape of a pair of holders, which are respectively provided on a seat cushion side and a seat back side and contact each other, thus increasing the operability and productivity thereof.

2. Related Art

A seat recliner for vehicles is a device which is provided on a driver seat or a passenger seat. When necessary, an user manipulates the seat recliner to adjust an angle of a seat back with respect to a seat cushion.

A seat recliner for vehicles includes a support bracket mounted on a seat frame in which seat cushion is installed, and a rotating bracket rotatably coupled to the support bracket. A seat back is coupled to the rotating bracket, and the angle between the seat back and a seat cushion can be adjusted by rotating the rotating bracket with respect to the support bracket. The seat recliner also includes a holder assembly that is a device connecting the rotating bracket to the support bracket. Rotation and setting a fixed position of the seat back with respect to the support is achieved by the holder assembly. The holder assembly has a guide holder coupled to the support bracket, and a slide holder coupled to the rotating bracket. The holder assembly further includes a clutch that has lock gears and a cam.

The lock gears and the cam are installed between the rotating bracket and the support bracket. Depending on the rotation of the cam, lock gears expands outwards or shrinks inwards. The rotating bracket has an internal thread in a portion retreated from the surface of the rotating bracket. When the lock gears expands, the lock gears are locked in the internal thread, and further rotation of the rotating bracket is prevented. When the lock gears shrinks inwards, the rotating gears freely rotates in a range preset by the structure of the recliner.

It has been an issue how to safely and securely control the rotation of the rotating bracket that is coupled to the seat back. For the safety of a user, it is important to provide a seat recliner for vehicles that is stable and durable in vibration, impact, and any other external force that could be applied to the seat back. Applicant has proposed a number of seat recliners for vehicles, which were disclosed in Korean Patent Laid-open Publication No. 2003-0092868 (published on Dec. 6, 2003), entitled "recliners for vehicles", Korean Patent Laid-open Publication No. 2003-0092869 (published on Dec. 6, 2003), entitled "high stiffness recliners for vehicles", and Korean Patent Laid-open Publication No. 2005-0023110 (published on Mar. 9, 2005), entitled "vehicle seat recliner having improved engagement strength."

It has been observed that in a poor design of the seat recliner, a machining error could lead to a malfunction of the seat recliner, which could reduce stability of the seat back and could cause an unexpected accident. On the other hand, a complicated design of the seat recliner may increase the security of the seat recliner, but would increase manufacturing cost and reduce efficiency of the manufacturing process. Therefore, it is an object of the present invention to provide a seat recliner that is stable and secure, and at the same time that simplifies the structure and improves the efficiency of the manufacturing process.

SUMMARY OF THE INVENTION

Accordingly, the present invention has been made keeping in mind the problems occurring in seat recliners, and an object of the present invention is to provide a seat recliner for vehicles which improves on the shape of a holder, thus preventing a malfunction of a seat back, and simplifying the manufacturing process thereof.

In order to accomplish the above mentioned object, the present invention provides a seat recliner for vehicles that includes a support bracket mounted to a seat frame, a guide holder coupled to the support bracket, a slide holder rotatably coupled to the guide holder and disposed between the support bracket and the guide holder, a rotating bracket coupled to the slide holder and mounted to a seat back, a clutch unit coupled to the slide holder and disposed between the guide holder and slide holder for controlling engagement of the slide holder with the guide holder, and a control unit coupled to the clutch unit for controlling the clutch unit. The slide holder includes a stop unit formed on a surface of the slide holder toward the support bracket, and the support bracket includes a stopper engaging with the stop unit for stopping a rotation of the slide holder.

The stop unit may include a plurality of stop protrusions spaced apart from a rotation axis of the slide holder by a predetermined distance. The stop protrusions are spaced apart from each other, and each of the stop protrusions is located on an arc of a circle encircling the rotation axis of the slide holder by a predetermined radius.

The support bracket may includes a rotation shaft support part supporting a rotation of the slide holder and aligned with the slide holder in a direction substantially perpendicular to the rotation axis of the slide holder. The rotation shaft support part is aligned with the slide holder in a manner that does not overlap the stop protrusions and the arc of the circle encircling the rotation axis of the slide holder. The rotation shaft support part may be formed in a sectorial shape, and the rotation shaft support part may have a stop edge that functions as the stopper.

The slide holder may have a slide groove formed on a surface toward the guide holder. The guide holder may include a guide protrusion that is formed on a surface of the guide holder toward the slide holder and spaced apart from a rotation axis of the slide holder by a predetermined distance. The guide protrusion is coupled to the slide groove and moves along the slide groove when the slide holder rotates.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

The present invention will now be described in detail in connection with preferred embodiments with reference to the accompanying drawings. For reference, like reference characters designate corresponding parts throughout several views.

Figure 1:
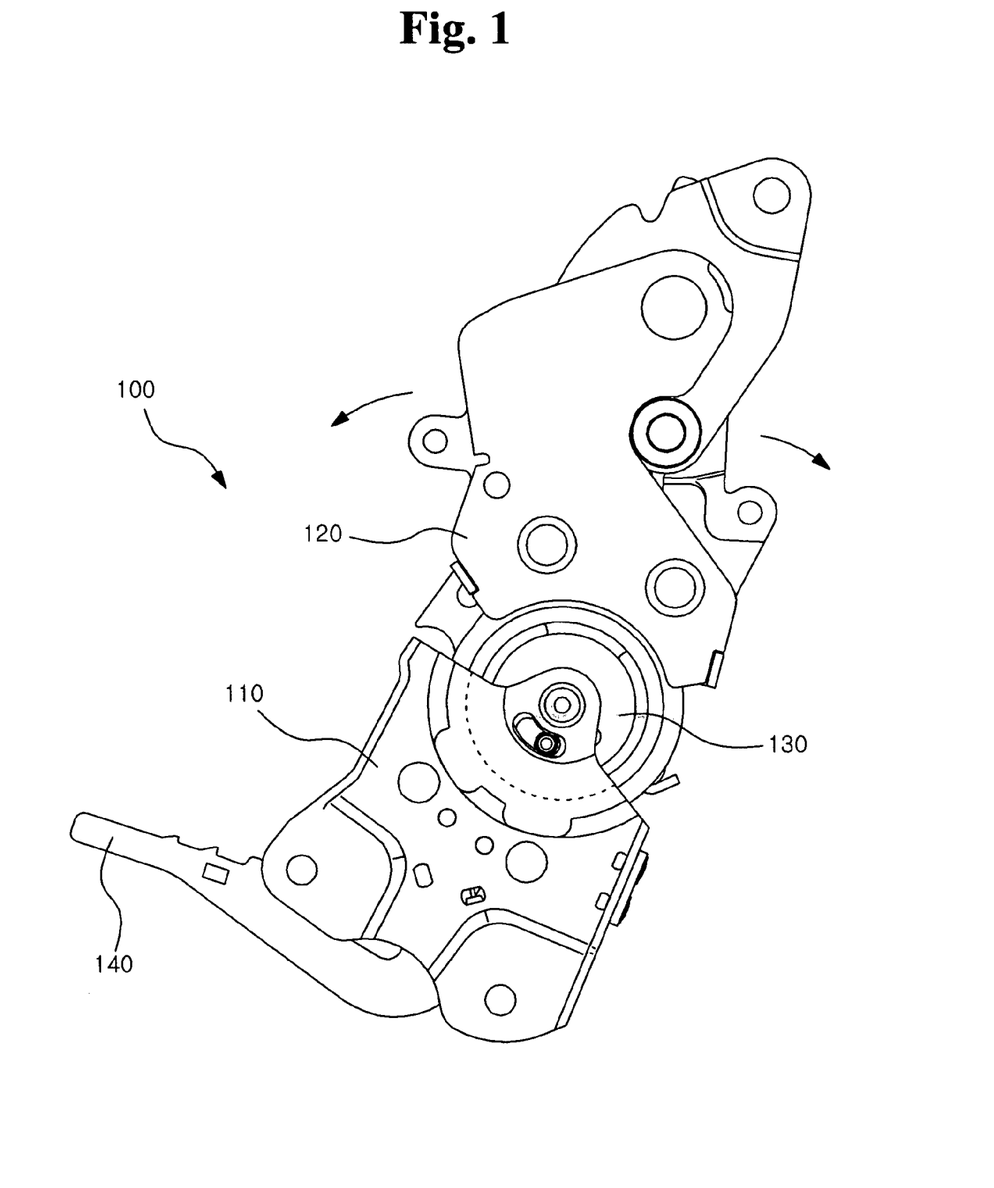
FIG. 1 is a front view showing a seat recliner for vehicles.

FIG. 1 shows seat recliner 100 for vehicles which is manufactured using some of the techniques described in the above-mentioned published patents. As shown in FIG. 1, seat recliner 100 for vehicles includes support bracket 110, which is mounted on a seat frame (not shown), and rotating bracket 120, which is rotatably coupled to support bracket 110 using holder assembly 130. A seat back (not shown) is coupled to rotating bracket 120, and the angle between the seat back and a seat cushion is changed by moving rotating bracket 120 forwards or backwards with respect to support bracket 110.

Figure 2:
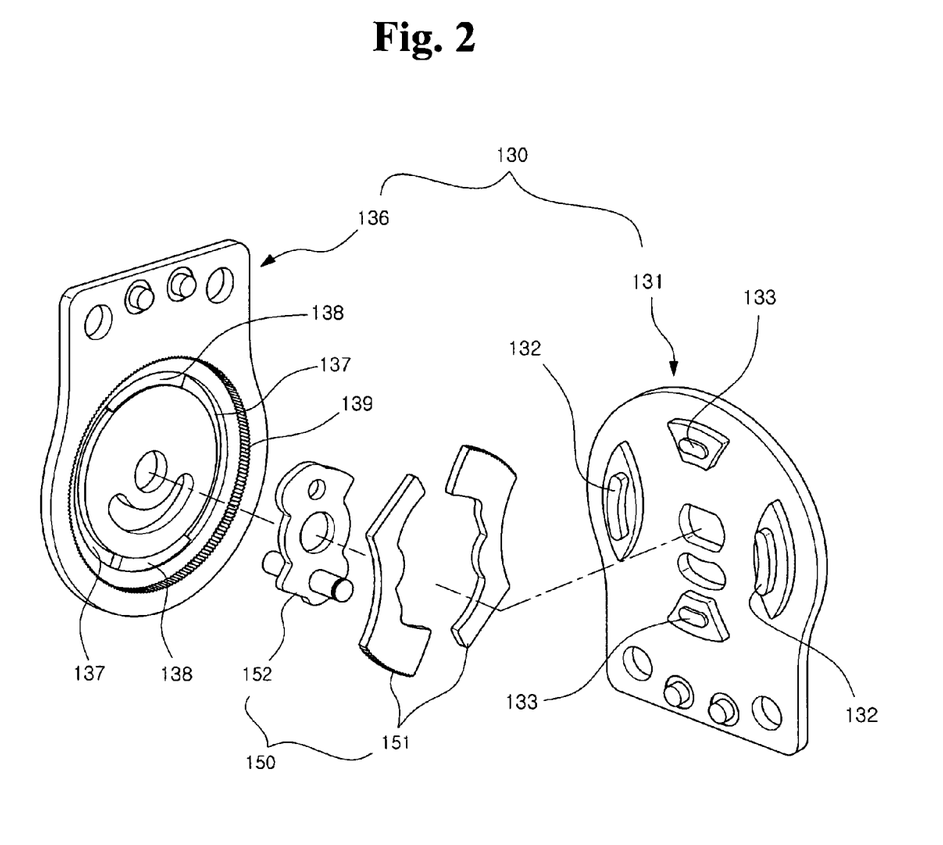
FIG. 2 is an exploded perspective view showing a guide holder, a slide holder, and a clutch constituting the seat recliner for vehicles of FIG. 1.

As shown in FIG. 2, holder assembly 130 includes guide holder 131 which is coupled to support bracket 110 (shown in FIG. 1), and slide holder 136 which is coupled to rotating bracket 120 (shown in FIG. 1). Furthermore, holder assembly 130 further includes clutch 150 that has lock gears 151 and cam 152, which are operated by manipulating lever 140 (shown in FIG. 1) to lock or unlock slide holder 136 to or from guide holder 131.

On the surface of guide holder 131, two first guide protrusions 132 are provided at left and right portions of guide holder 131, respectively, and two second guide protrusions 133 are provided at upper and lower portions, respectively. Particularly, they are constructed in a manner that the height of first guide protrusions 132 is greater than that of second guide protrusions 133.

Furthermore, in the surface of slide holder 136, two first slide grooves 137 are provided at left and right portions of slide holder 136 respectively which correspond to the positions of two first guide protrusions 132. Second slide grooves 138 are formed at upper and lower portions respectively which correspond to the positions of second guide protrusions 133. The depth of first slide grooves 137 is greater than that of second slide grooves 138. First guide protrusions 132 positioned at left and right portions of guide holder 131 are inserted into respective first slide grooves 137, and second guide protrusions 133 disposed at upper and lower portions of guide holder 131 are inserted into respective second slide grooves 138 (refer to FIG. 3a)

Figure 3A:
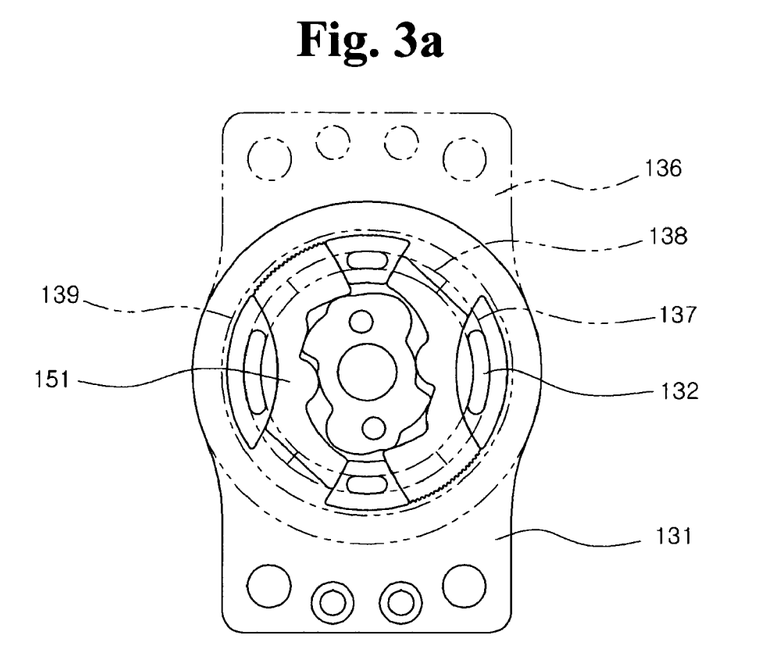
FIGS. 3a and 3b are sectional views showing assembly of the guide holder, the slide holder, and the clutch of FIG. 2 at a initial position and at a rotated position, respectively.
Figure 3B:
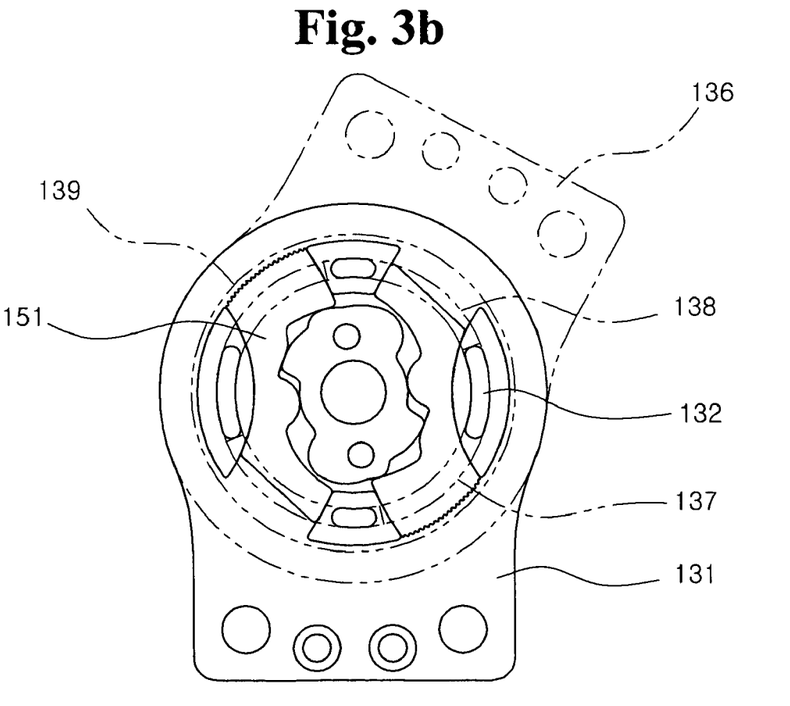

According to holder assembly 130 having the above-mentioned structure, as shown in FIGS. 3a and 3b, slide holder 136 is limitedly rotated within a range that is defined by a margin in which first guide protrusions 132 are allowed to slide along respective first slide grooves 137. Therefore, the rotation, which represents the reclining angle of the rotating bracket 120 (shown in FIG. 1) and accordingly the seat back (not shown) that are integrally rotated with slide holder 136, is limited within the range described in this paragraph and shown in FIGS. 3a and 3b.

As shown in FIG. 3b, maintaining a fixed position of slide holder 136, which has been rotated, is achieved by mechanisms of contacting and supporting first guide protrusions 132 with second slide grooves 138 and engaging lock gears 151 with internal thread 139 (shown in FIG. 2). However, if a machining error exists in the above-mentioned elements that serve as support and engagement elements, slide holder 136 is not completely fixed at the position, and there is a minute relief angle (that is, clearance) by which slide holder rotates. As a result, there is a problem that the loose slide holder causes the seat back, which has been rotated at a certain ankle, rattling.

Furthermore, in seat recliner 100 for vehicles, a difference in height between first and second guide protrusions 132 and 133 and a difference in depth between first and second slide grooves 137 and 138, which correspond to the first and second guide protrusions 132 and 133, respectively, are relatively small due to machining restrictions. If machining errors in first and second guide protrusions 132 and 133, or in first and second slide grooves 137 and 138 are relatively large, if engagement between holders 131 and 136 is loosened, or if excessively large external force is applied to the seat to rotate the seat back, first guide protrusions 132, which have been inserted in slide grooves 137 to support rotation of slide holder 136, may undesirably further move passing first slide grooves 137 and engage with second slide grooves 138. In this case, the reclining angle of slide holder 136 exceeds the predetermined range so that the seat back undesirably further reclines backwards or is excessively folded forwards.

Moreover, in seat recliner 100 for vehicles, because the shapes of first and second glide protrusions 132 and 133 and first and second slide grooves 137 and 138 are complicated, the molds for forming the seat recliner and the parts of the seat recliner also have complicated shapes. Hence, there is a problem that the manufacturing cost for making the products is increased.

In order to solve the problems pointed above, an embodiment of the present invention will be described in detail with reference to the attached drawings.

Figure 4:
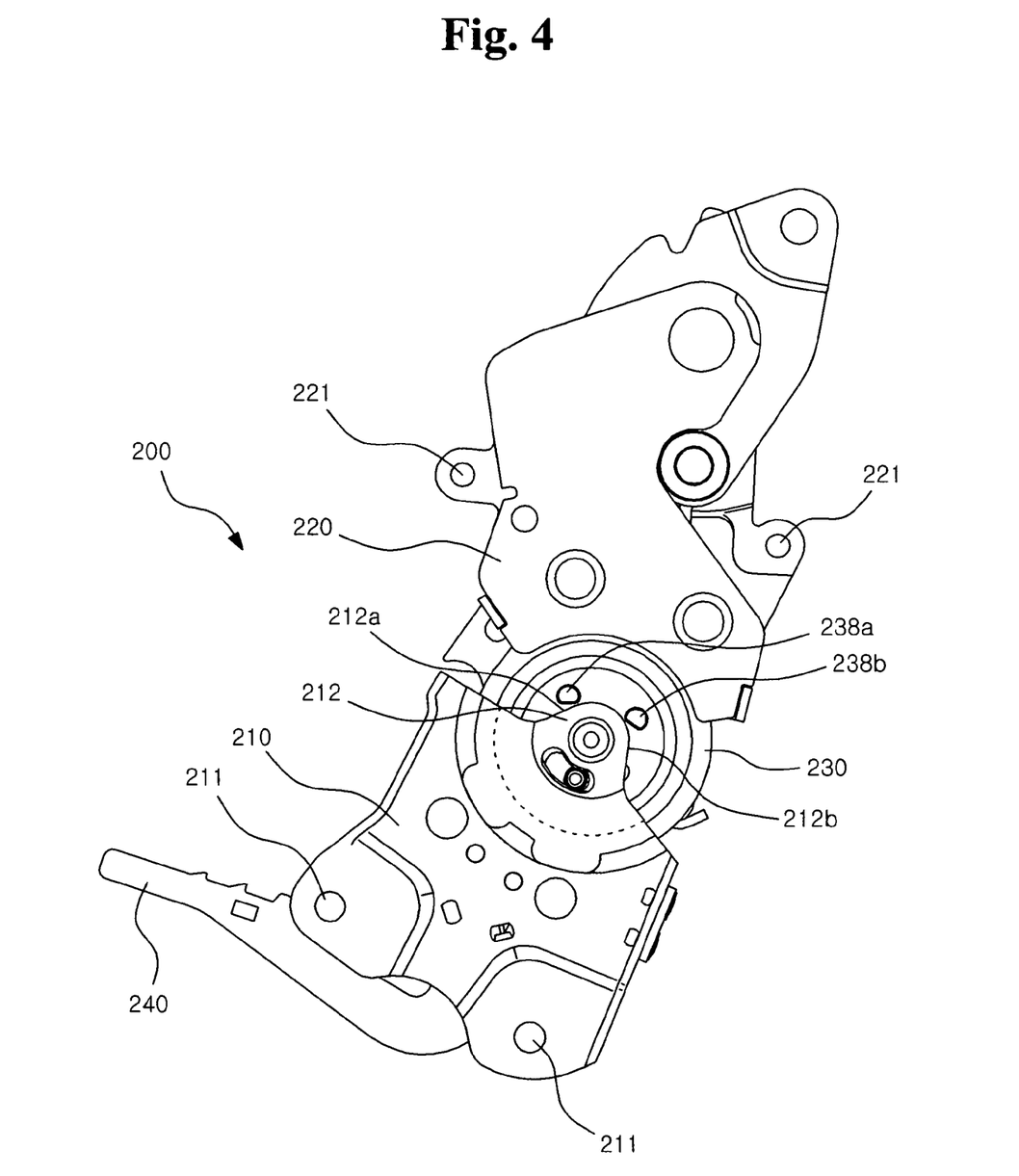
FIG. 4 is a front view of a seat recliner for vehicles constructed as an embodiment of the present invention.
Figure 5:
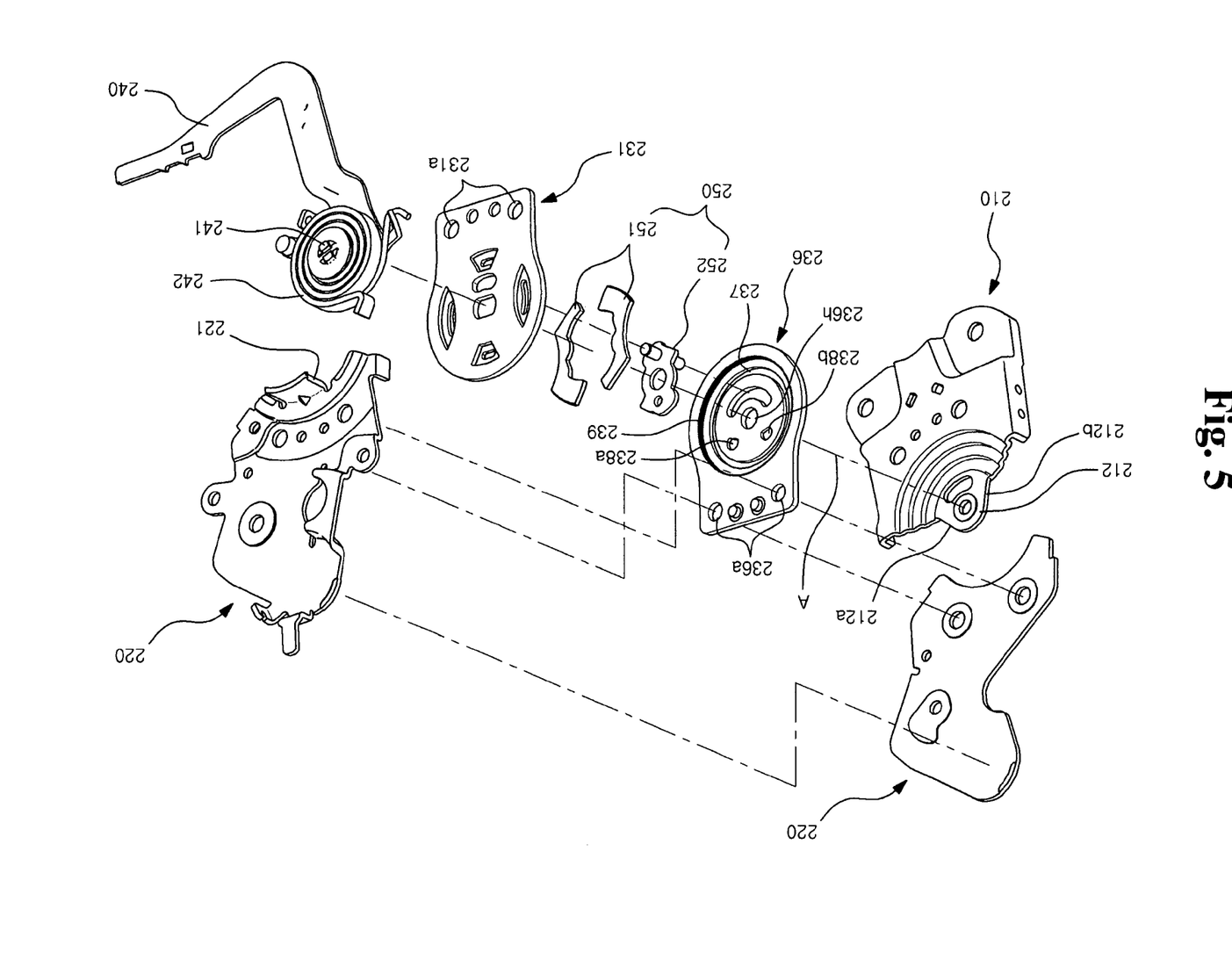
FIG. 5 is an exploded perspective view of the seat recliner for vehicles of FIG. 4.

As shown in FIGS. 4 and 5, seat recliner for vehicles 200 constructed as an embodiment of the present invention includes support bracket 210, which is mounted to a seat frame (not shown) through mounting holes 211 formed around the lower end of the support bracket 210, and rotating bracket 220, which is rotatably coupled to support bracket 210 through holder assembly 230. Rotating bracket 220 is mounted to a seat back (not shown) through mounting holes 221. The angle, at which the seat back is reclined, is adjusted by moving rotating bracket 220 with respect to support bracket 210.

Figure 6:
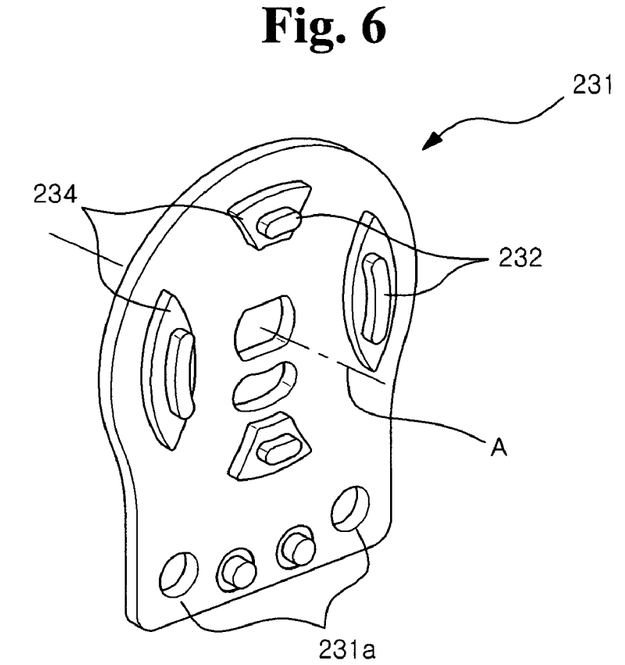
FIG. 6 is a perspective view showing a guide holder constituting the seat recliner for vehicles of FIG. 4.
Figure 7:
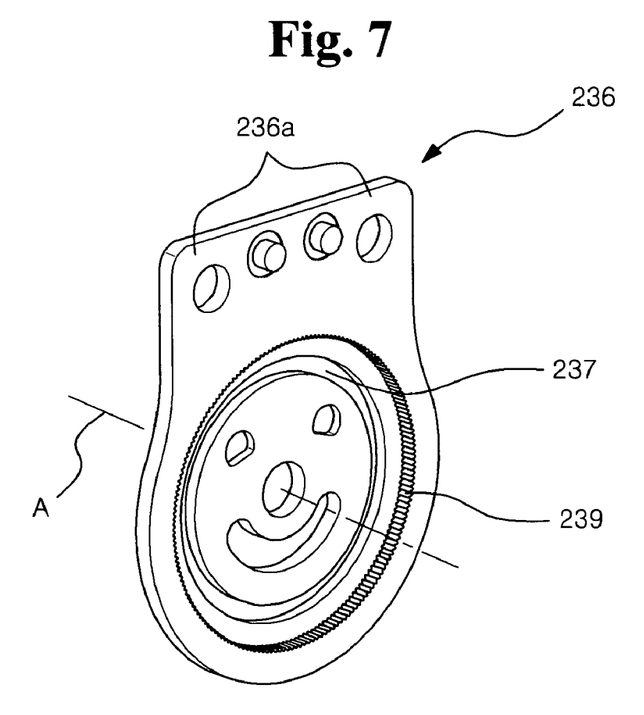
FIG. 7 is a perspective view showing a slide holder constituting the seat recliner for vehicles of FIG. 4.

As shown in FIG. 5, holder assembly 230 includes guide holder 231, which is coupled to support bracket 210 through first coupling part 231a provided in the lower end of guide holder 231, and slide holder 236, which is coupled to rotating bracket 220 through second coupling part 236a provided in an upper end of slider holder 236. Holder assembly 230 further includes clutch 250, which has lock gears 251 and cam 252 that are operated by manipulating lever 240 to lock or unlock slide holder 236 to or from the guide holder 231. As shown in FIGS. 6 and 7, in order to lock or unlock slide holder 236, guide holder 231 has guide parts 234 that guide lock gears 251 (shown in FIG. 5), and slide holder 236 has internal thread 239 that engages with lock gears 251. Lever 240 (shown in FIG. 5) serves as a manual control device for controlling rotation of cam 252.

Referring to FIG. 5, rotation shaft 241, which is coupled to cam 252, is provided on lever 240. Coil spring 242 is coupled to lever 240, so that, when external force is removed from lever 240 after rotating lever 240, lever 240 returns to the original position thereof driven by restoring force of coil spring 242.

Figure 8:
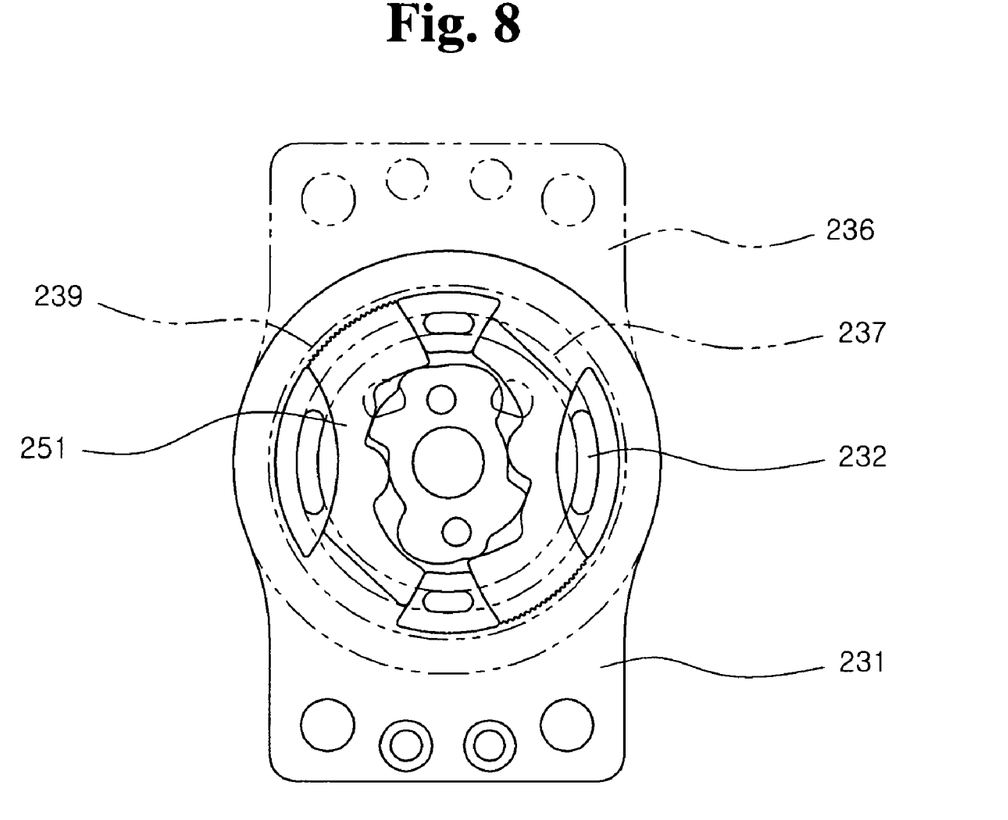
FIG. 8 is a sectional views showing assembly of the guide holder and the slide holder of FIG. 5.

Describing in detail, the inner end of coil spring 242 is coupled to rotation shaft 241, and the outer end of coil spring 242 is held by stop piece 221 which is provided on rotating bracket 220. Cam 252 is coupled to lock gears 251 in a manner that lock gears 251 move outwards (expanding in diameter) or inwards (shrinking in diameter) depending on the rotation of cam 252. As shown in FIGS. 5 and 8, lock gears 251 engage with internal thread 239 of slide holder 236 when lock gears 251 extend, and are released from internal thread 239 when lock gears 252 shrink. Therefore, when rotation shaft 241 is rotated by manipulating lever 240, lock gears 251, which engage with internal thread 239 of the slide holder 236, symmetrically shrinks sliding inwards and guided by guide parts 234. Thereby, guide holder 231 is released from slide holder 236. When lever 240 is released, lever 240 and cam 252, which are integrally coupled to lever 240, are returned to the original position thereof driven by coil spring 242. Then, lock gears 251 extends outwards, and thus engage with internal thread 239 of slide holder 236.

As shown in FIG. 6, guide protrusions 232 are provided on a surface of guide holder 231 at predetermined positions. Guide protrusions 232 are spaced apart from rotation axis A of slide holder 236 by predetermined distances, and also are spaced apart from each other. The heights of guide protrusions 232 are the same. As shown in FIG. 7, ring-shaped slide groove 237, having a constant depth, is formed in a surface of slide holder 236. The position and shape of slide groove 237 are designed to correspond to those of guide protrusions 232, so that all guide protrusions 232 can be matched with and inserted into ring-shaped slide groove 237 (refer to FIG. 8). In the above-mentioned structure and configuration of guide protrusions 232 and the slide groove 237, guide protrusions 232 are able to slide along slide groove 237 without restriction when guide holder 231 and the slide holder 236 are assembled with each other. In other words, in this embodiment of the present invention, slide holder 236, which is assembled with the guide holder 231, can rotate with respect to guide holder 231 without restriction. Therefore, the present invention provides a structure that the rotation of guide holder 231 does not interfere with slide holder 236.

On the other hand, as shown in FIGS. 4 and 5, reclining rotation of slide holder 236 is limited by both of rotation shaft support part 212 of support bracket 210 and stop protrusions 238a and 238b formed on slider holder 236. Stop protrusions 238a and 238b are provided on a surface of slider holder 236, but on the opposite surface in which slide groove 237 is formed. Describing in detail, stop protrusions 238a and 238b are provided on the surface of slide holder 236 opposite to the surface thereof where slide holder 236 rotatably contacts with guide holder 231. Stop protrusions 238a and 238b are separated from each other, and are spaced apart from rotation axis A of slide holder 236. The distance between rotation axis A and each of stop protrusions 238a and 238b is the same. In the other words, each of stop protrusions 238a and 238b is located on an arc of a circle encircling the rotation axis A of slide holder 236 by a predetermined radius.

Furthermore, as shown in FIGS. 4 and 5, rotation shaft support part 212 is provided on support bracket 210. Rotation shaft support part 212 has a sectorial shape, and receives and supports rotation shaft 241 that passes through shaft hole 236h of slide holder 236. Herein, the sectorial shape is defined to include a basic shape having a part of the interior of a circle bounded by two radii and an arc, and to include slight modification of the basic shape such as the shape shown in FIG. 4. FIG. 4 shows rotation shaft support part 212 partly covering holder assembly 230, and stop protrusions 238a and 238b formed on a portion of slide holder 236 where holder assembly 230 is not covered by rotation shaft support part 212. Therefore, stop protrusions 238a and 238b and rotation shaft support part 212 are coupled during an operation in a manner that the rotation of slide holder 236 is stopped at a predetermined angle, when one of stop protrusions 238a and 238b contacts one of stop edges 212a and 212b of rotation shaft support part 212. Further rotation of slide holder 236 is thereby limited. Here, rotation shaft support part 212 is rotatably coupled to rotation shaft 241 to support the rotation of slide holder 236. Rotation shaft support part 212 serves as a stopper which limits the rotation of slide holder 236 within a predetermined range of angles.

As described above, in this embodiment, the limitation of rotation of slide holder 236 is achieved by stop protrusions 238a and 238b and sectorial rotation shaft support part 212, having the stop edges 212a and 212b. Stop protrusions 238a and 238b, however, can be replaced with a single protrusion, which is provided on the surface of the slide holder 236 and extends by a predetermined length along an arc of a circle encircling rotation axis A of slide holder 236. The limitation of rotation of slide holder 236 can be achieved by a difference method from the method described in this preferred embodiment. A stop unit may have different structure and shape, and a separate stop member, which is provided on the support bracket 210, may be used as a stopper to replace or further support the above-mentioned stop unit.

Figure 9:
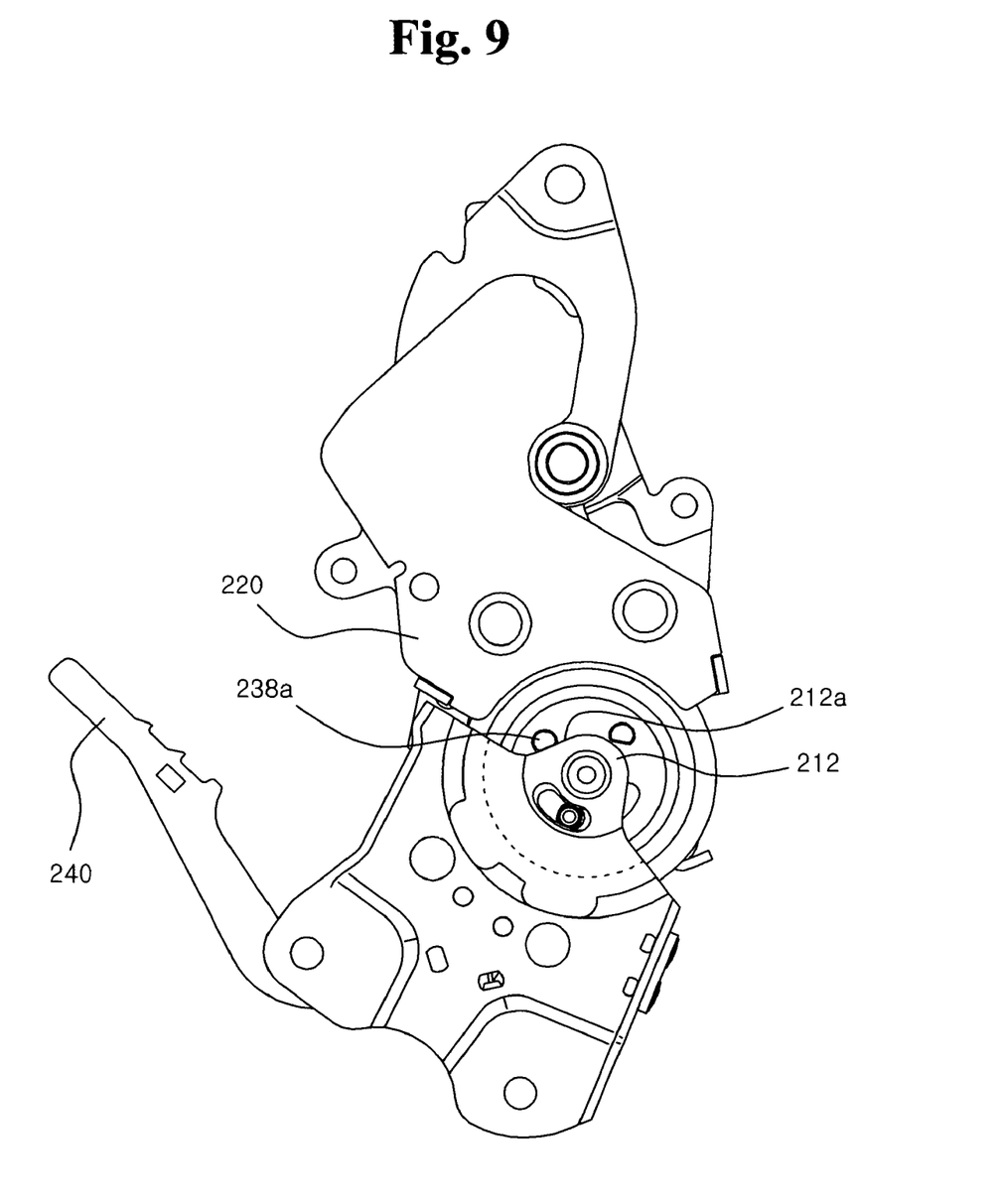
FIG. 9 is a front view showing an operation of the seat recliner for vehicles of FIG. 4.

FIG. 9 is a view showing seat recliner 200 for vehicles of this embodiment when reclining rotation of rotating bracket 220 is limited. As shown in FIG. 9, when rotating bracket 220 is rotated by a predetermined angle, stop protrusion 238a contacts with stop edge 212a of rotation shaft support part 212 so that further rotation of rotating bracket 220 is prevented.

The seat recliner for vehicles of the present invention includes a stop unit, such as stop protrusions 238a and 238b, and a stopper, such as rotation shaft support part 212 which stops the rotation of the stop unit. Therefore, this embodiment of the present invention does not require a double-stepped structure shown in holder assembly 130 of FIG. 2, which includes first and second guide protrusions 132 and 133 and first and second slide slots 137 and 138 which has the same functions as the stop unit and the stopper of the present invention. Therefore, as shown in FIGS. 6 and 7, in this embodiment of the present invention, the heights of guide protrusions 232 are the same, and the ring-shaped slide groove 237 may have a constant depth.

As described above, in a seat recliner for vehicles of the present invention, the angular range in which a seat back can be reclined is determined by a stop unit which is provided on the surface of a slide holder, and by a stopper which is provided on a support bracket. Therefore, any marginal error or clearance is prevented between a slide holder and a guide holder. Furthermore, when the seat back is rotated, the slide holder is supported by the stopper. Therefore, even if large external force is applied to the seat back, which has been rotated, the seat back is prevented from undesirably folding, because there is no possibility that the slide holder crosses over the stopper.

As well, because of this rotation restriction unit, the shapes of the guide holder and the slide holder can be simplified. Therefore, it is easy to manufacture molds for fabricating the guide holder and the slide holder. The use of these molds makes it possible to enhance the productivity of manufacturing the holders. As a result, overall efficiency of manufacturing process of the seat recliner for vehicles is improved.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A seat recliner for vehicles, comprising:
   a support bracket mounted to a seat frame;
   a guide holder coupled to the support bracket;
   a slide holder rotatably coupled to the guide holder and disposed between the support bracket and the guide holder, the slide holder including a stop unit formed on a surface of the slide holder facing the support bracket, the support bracket including a stopper engaging with the stop unit for restricting a rotation of the slide holder, the stop unit including a plurality of stop protrusions spaced apart from a rotation axis of the slide holder, the stop protrusions also spaced apart from each other the support bracket including a rotation shaft support part supporting a rotation of the slide holder, the rotation shaft support part aligned not overlapping the stop protrusions formed on the slide holder, the rotation shaft support part being aligned substantially parallel to the slide holder, the rotation shaft support part having a stop edge, the stopper including the stop edge;
   a rotating bracket coupled to the slide holder and mounted to a seat back;
   a clutch unit coupled to the slide holder and the guide holder, and disposed between the guide holder and slide holder for controlling engagement of the slide holder with the guide holder, and
   a control unit coupled to the clutch unit for controlling the clutch unit.

2. The seat recliner as set forth in claim 1, wherein distances between the rotation axis of the slide holder and each of the stop protrusions are the same.

3. The seat recliner as set forth in claim 1, comprised of the rotation shaft support part having a sectorial shape.

4. The seat recliner as set forth in claim 1, comprised of the slide holder having a slide groove formed on a side of the slide holder facing the guide holder, the slide groove formed in a substantially ring shape, the guide holder including a guide protrusion formed on a side of the guide holder facing the slide holder and spaced apart from a rotation axis of the slide holder by a predetermined distance, the guide protrusion coupled to the slide groove and sliding along the slide groove when the slide holder rotates.

5. The seat recliner as set forth in claim 1, comprised of the clutch unit including a lock gear and a cam coupled to the lock gear, the cam rotating between a first position and a second position, the lock gear locking the slide holder when the cam is rotated to the first position, and the lock gear unlocking the slide holder when the cam is rotated to the second position.

6. The seat recliner as set forth in claim 5, comprised of the guide holder including a guide part formed on a surface of the guide holder for guiding the lock gear.

7. The seat recliner as set forth in claim 6, comprised of the slide holder having a slide groove formed on a side of the slide holder facing the guide holder, the slide groove formed in a substantially ring shape, the guide holder including a guide protrusion formed on a side of the guide holder facing the slide holder and spaded apart from a rotation axis of the slide holder by a predetermined distance, the guide protrusion coupled to the slide groove and sliding along the slide groove when the slide bolder rotates.

8. The seat recliner as set forth in claim 7, comprised of the guide protrusion formed on the guide part.

9. The seat recliner as set forth in claim 5, comprised of the slide holder including an internal thread formed on a side of the slide holder facing the guide holder and coupled to the lock gear to lock the slide holder.

10. A seat recliner for vehicles, comprising:
    a support bracket mounted to a seat frame;
    a guide holder coupled to the support bracket;
    a slide holder rotatably coupled to the guide holder and disposed between the support bracket and the guide holder, the slide holder having an internal thread formed on a side of the slide holder facing the guide holder and a slide groove formed on a side of the slide holder facing the guide holder, the slide groove formed in a substantially ring shape, the guide holder including a guide protrusion formed on a side of the guide holder facing the slide bolder and spaced apart from a rotation axis of the slide holder by a predetermined distance, the guide protrusion coupled to the slide groove and sliding along the slide groove when the slide holder rotates, the slide holder including a stop unit formed on a surface of the slide holder facing the support bracket, the support bracket including a stopper engaging with the stop unit for restricting a rotation of the slide holder, the stop unit including a plurality of stop protrusions spaced apart from a rotation axis of the slide holder, the support bracket including a rotation shaft support part supporting a rotation of the slide holder, the rotation shaft support part aligned not overlapping the stop protrusions formed on the slide holder, the rotation shaft support part being aligned substantially parallel to the slide holder, the rotation shaft support part having a stop edge, the stopper including the stop edge;
    a rotating bracket coupled to the slide holder and mounted to a seat back;
    a clutch unit coupled to the slide holder and the guide holder, and disposed between the guide holder and slide holder for controlling engagement of the slide holder with the guide holder, the internal thread of the slide holder coupled to the clutch to lock the slide holder; and
    a control unit coupled to the clutch unit for controlling the clutch unit.

11. The seat recliner as set forth in claim 10, wherein the stop protrusions are spaced apart from each other.

12. The seat recliner as set forth in claim 11, wherein the rotation shaft support part is aligned substantially parallel to the slide holder.

* * * * *